INVENTORS
HAROLD W. BURNEY
WALTER J. BISSINGER
FRED K. LANDECKER
BY Kane, Dalsimer, Kane & Smith
ATTORNEYS

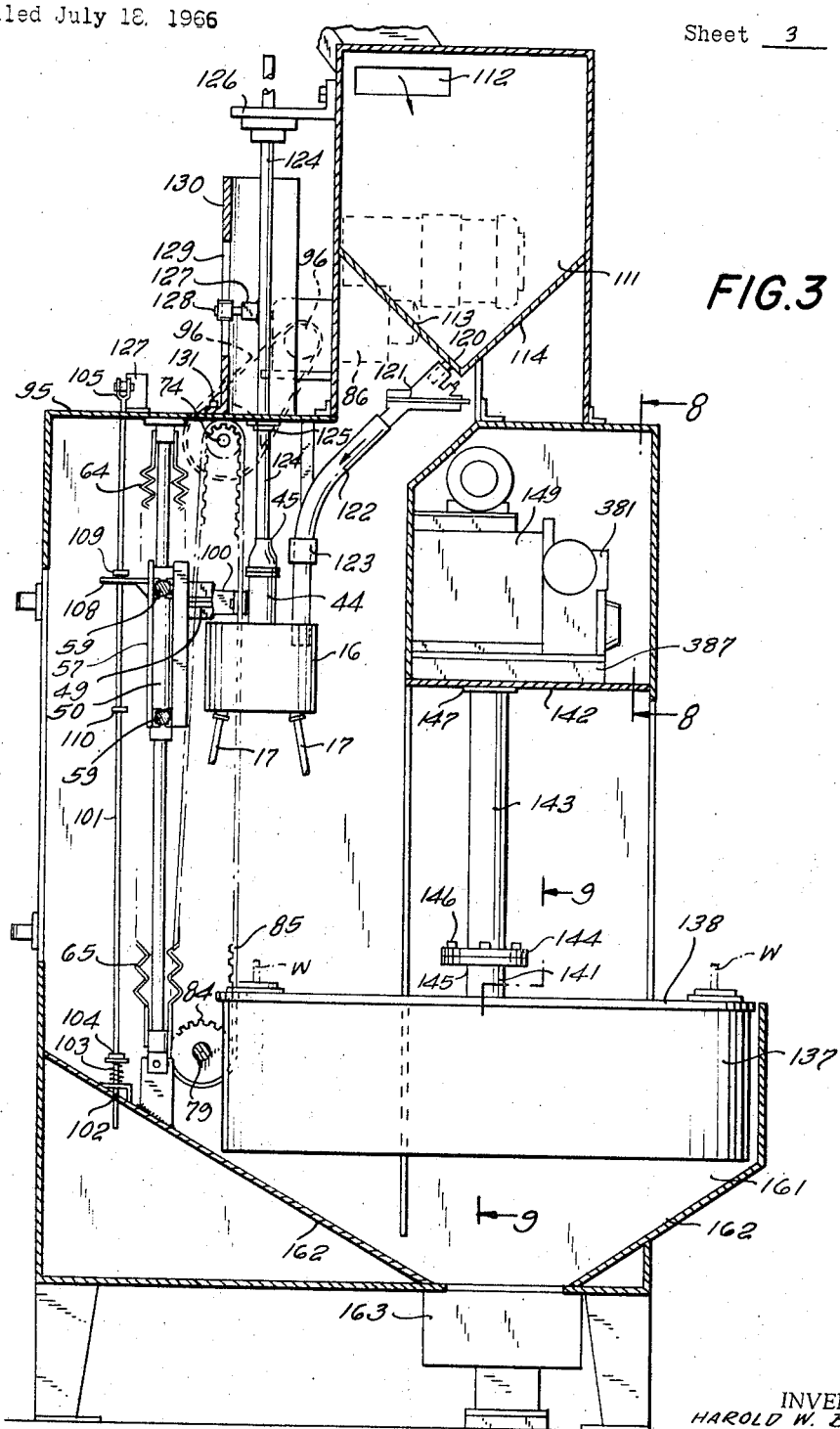

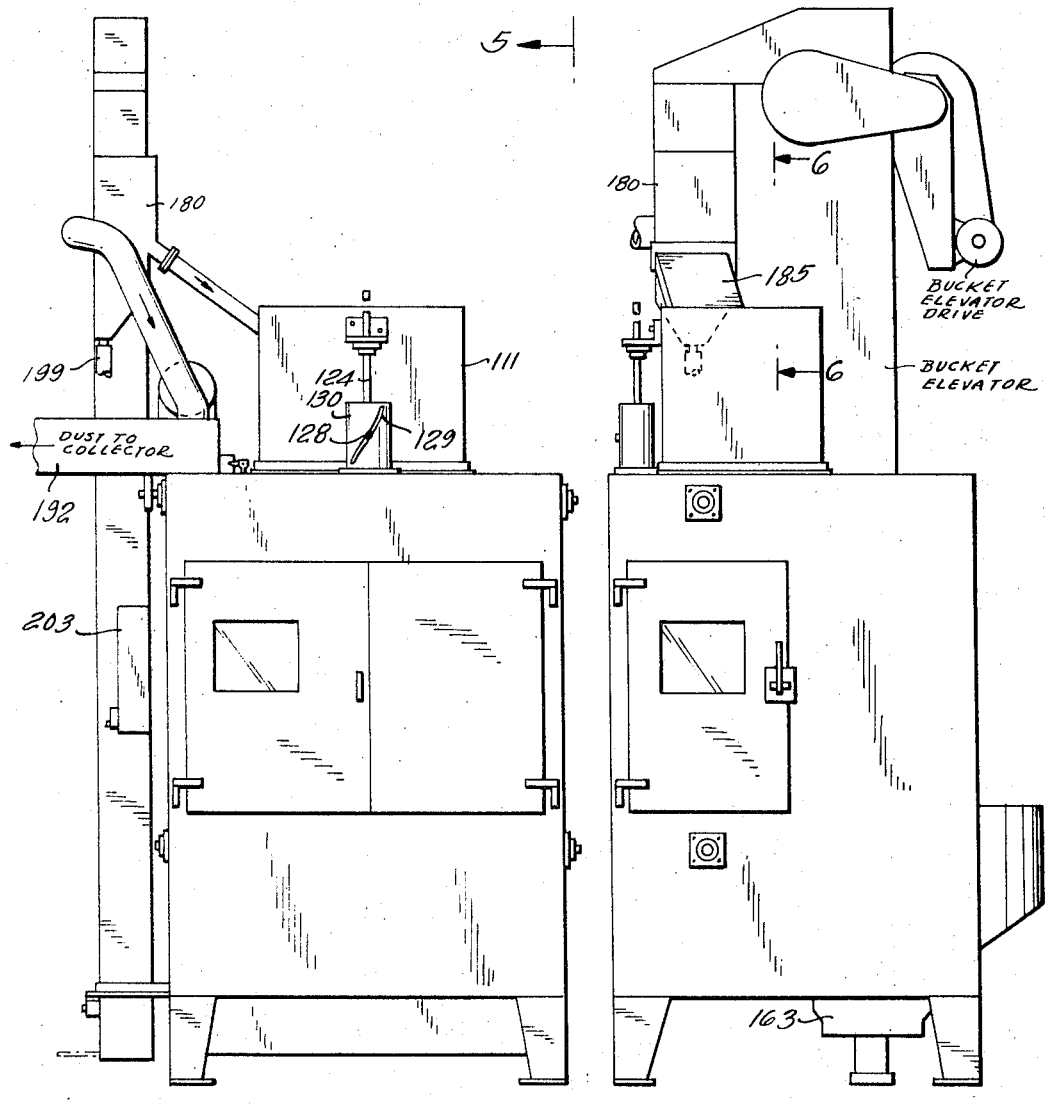

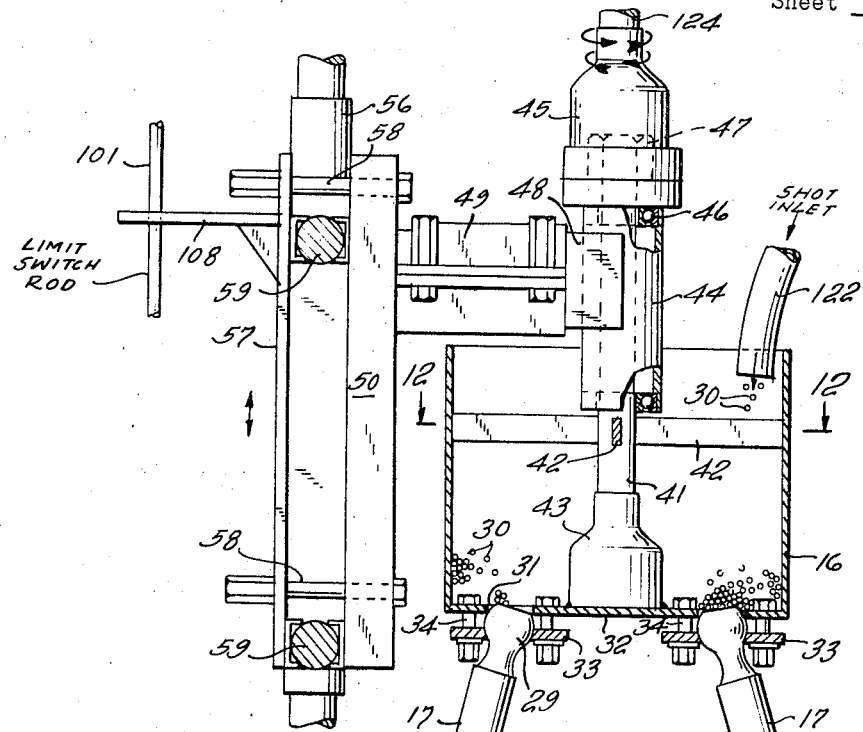
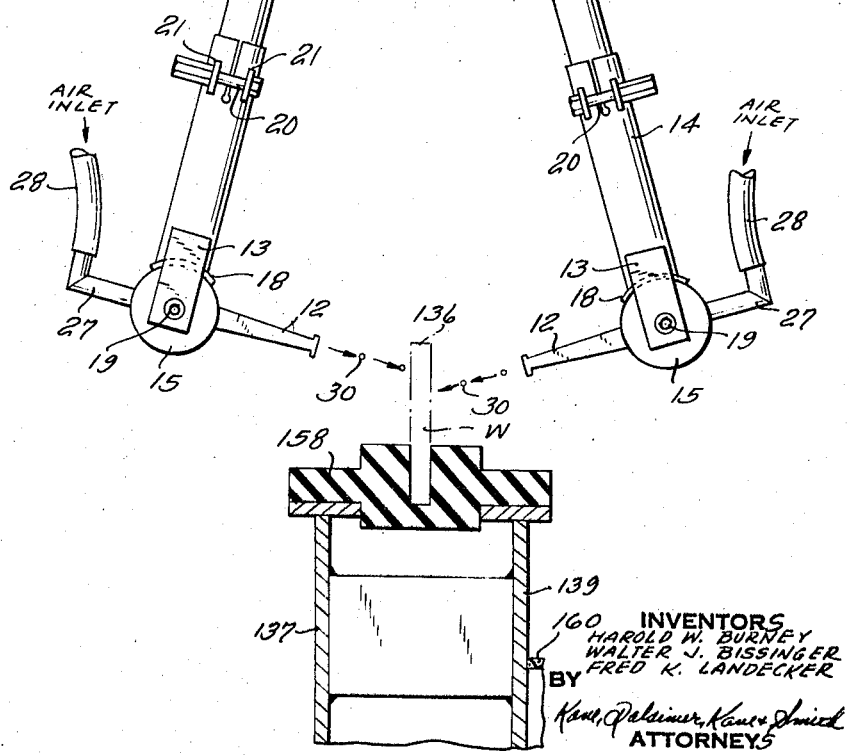
FIG.11

United States Patent Office 3,423,976
Patented Jan. 28, 1969

3,423,976
BLADE PEENING APPARATUS WITH
INDEXING CONTROL
Harold W. Burney, Hackensack, and Walter J. Bissinger, Convent Station, N.J., and Fred K. Landecker, Los Angeles, Calif., assignors to Metal Improvement Company, Hackensack, N.J., a corporation of New York
Filed July 18, 1966, Ser. No. 566,117
U.S. Cl. 72—53                        32 Claims
Int. Cl. B21d 31/06; B24b 1/00; B24c 3/12

ABSTRACT OF THE DISCLOSURE

A peening apparatus particularly adapted to transport work toward and away from a peening position. The peening is carried on in a reciprocating fashion by a multiplicity of peening nozzles and appropriate indexing mechanisms are utilized for controlling the position of the work and its movement toward and away from the peening jets.

This invention relates to peening apparatus of a form in which the work is transported toward and away from controlled position and reciprocating peening nozzles and with which appropriate indexing mechanisms are utilized for controlling the position of the work and its movement toward and away from the peening apparatus, as well as the operative status of the peening facility during indexing and its position relative to the work.

In peening relatively small components, it is important, in order to provide for the greatest possible periods of continuity of operation, to stop the flow of shot from the nozzle jets of the peening equipment only during the very limited time period when indexing and replacement of work-pieces that are to be treated actually occurs. The present invention is one by which a work-piece carrier may be loaded with a plurality of articles to be treated. The articles are then moved one by one into positioning relative to the peening apparatus so that each can be treated and hardened, after which the peened article is then promptly transported to an unloading position concurrently with the positioning of an untreated component within the operating range of the peening component itself. The peening apparatus is arranged during each period between indexing to a new work-piece to rotate to a limited extent relative to the work and also to make a selected number of traverses across the work. This speeds the treatment substantially, and, by providing suitable indexing at selected parts of the movement, it tends to insure a more uniform time period of subjection of the articles to be peened to the actual peening operation than is otherwise usually the case.

In its preferred form, and stated very briefly, the invention comprises the combination of a plurality of peening nozzles or jets arranged to direct shot to be ejected therefrom under fluid pressure toward the work to be treated. The work to be treated is supported on an intermittently operating and suitably indexed turntable arranged to be rotated relative to the peening nozzles or jets to move the work toward and away from said jets at a selected rate. The peening jets or nozzles eject shot toward the work according to a path pattern and a shot density which is commensurate with the extent of peening required at different areas of the supplied work. Concurrently with the shot ejection from the nozzles to impact the work, the multiplicity of nozzles is moved up and down in a reciprocating path relative to the work so that the shot ejected from each nozzle shall in sequence reach substantial areas of the work. At the same time, the plurality of jets are adapted to be turned back and forth through a limited arc relative to the impacted work-piece so that the ejected shot will cover the work along a dimension transverse to the up and down movement of the nozzles. The movement of the nozzles along the selected arcuate path occurs during the back and forth movement and is controlled so that the work to be treated is exposed to the peening operation over a substantial area on each side.

Control of the movement of the jets in an up and down direction, which may be assumed to correspond to the long dimension of the work supplied, is appropriately controlled by a drive and reciprocating mechanism carrying the nozzles between two selected limiting positions. The nozzle movement may be adjusted at the will of the operator to different stroke lengths depending upon the size of the work-piece to be treated. Similarly, the back and forth rotary motion of the nozzles or jets in an arcuate path simultaneously with the up and down motion is obtained in a selective fashion to cover selected angles by appropriately chosen cam elements which also establish the rate at which the nozzles or jets are turned although maintaining the operation so that the complete amount of each clockwise or counterclockwise angular rotation occurs during the stroke moving the jets in either the up or the down direction. The indexing of the turntable holding the work occurs following a selected number of reciprocating paths of the nozzles and at a time when the control interrupts both the nozzle movement and the fluid supply so that no shot can be ejected.

The invention also provides structure for recovering and cleaning the ejected shot so that it may be used over and over again. Various forms of interlocks and valve controls coordinate the nozzle and work movement and the fluid pressure effective upon the ejected shot. With the foregoing in mind, the present invention has for its primary object that of providing greater uniformity in the quality of the peened products, for providing a faster rate of manufacture and for providing greater efficiency in the area over which the articles to be peened can be apppropriately treated. Various other objects and advantages will suggest themselves from a consideration of the following description in connection with the accompanying drawings wherein:

FIG. 3 is a side sectional view showing particularly the general relationship and positioning of the peening jets relative to the work turntable by which the articles are supplied and also showing the support and control of each of the jets and the feed hopper, as well as the turntable for supporting the work;

FIG. 4 is a front elevational view of the apparatus showing particularly the housing structure by which used peening shot and dirt are retained within the confines of the apparatus;

FIG. 5 is a side elevational view of the apparatus of FIG. 4, looking approximately in the direction shown by the arrows 5—5 in FIG. 4;

FIG. 11 is a sectional view showing the multiple nozzle support and the positioning thereof relative to the work to be handled;

Figure 14:
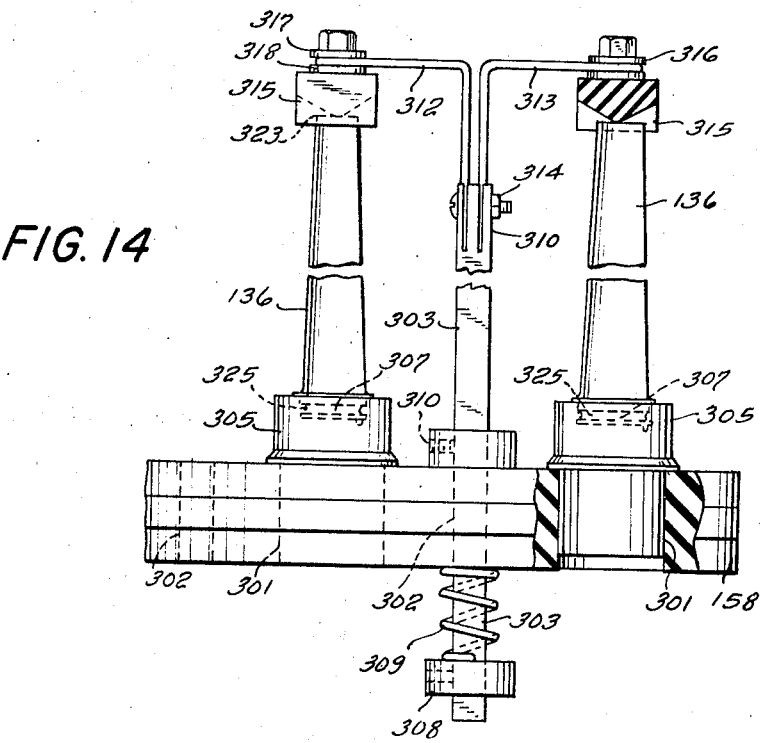
FIG. 14 is a view of a work support element to hold work to supporting units on the work turntable positioning the work so that a portion thereof can be peened.
Figure 15:
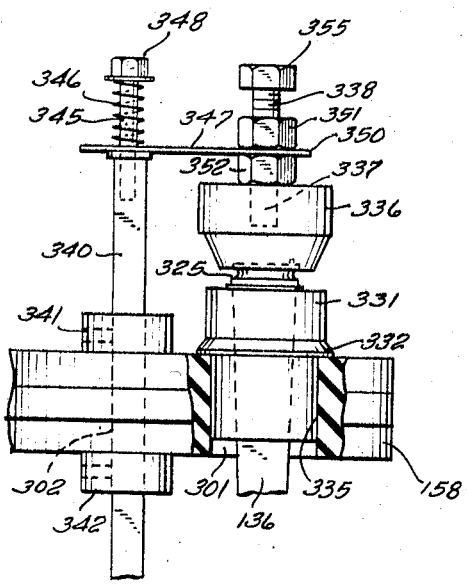
Figure 16:
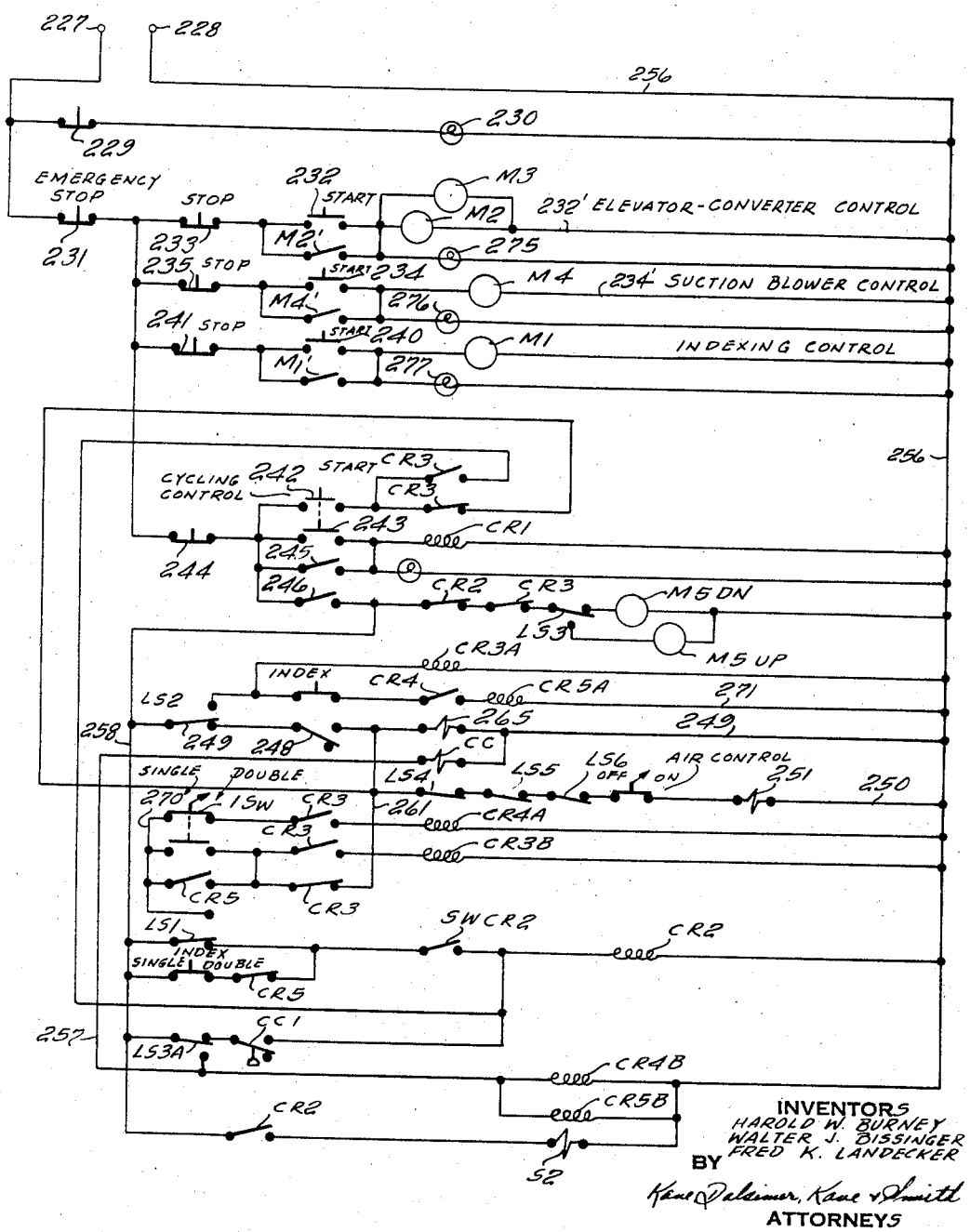

FIG. 15 is a view of a second form of work support element for peening the work after its reversal from the positioning in FIG. 14 so that the work portions held out of the field of the nozzle jets when peened in the location of FIG. 14 may be peened while protecting other previously peened regions; and FIG. 16 is a simplified electrical diagram of the connections for controlling movement of the peening components, the movement and indexing of the work-holding turntable and the fluid supply for operating the various nozzle elements.

Figure 1:
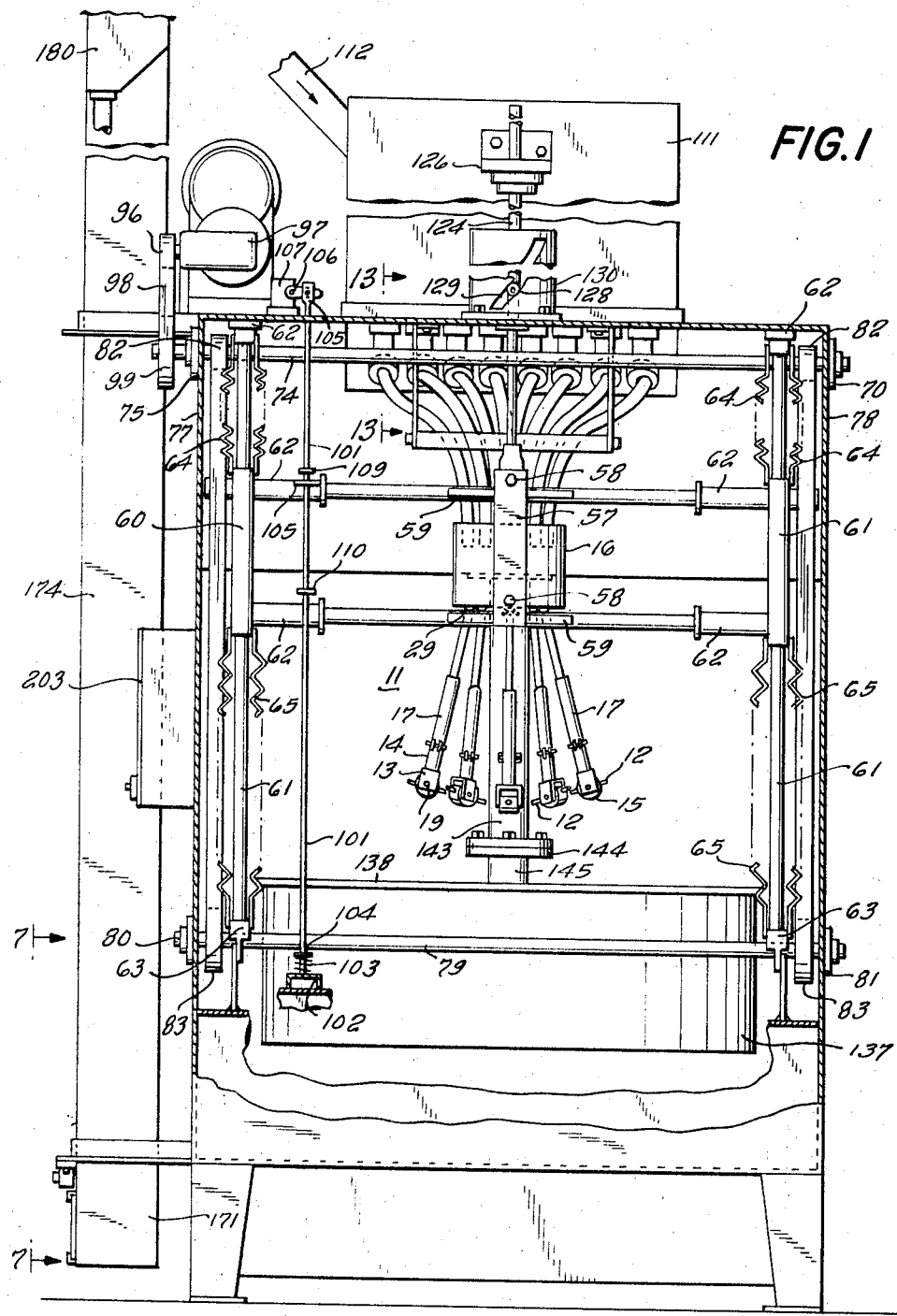
FIG. 1 is a front sectional view showing the apparatus in one of its preferred forms.

Referring now to the drawings for a further understanding of the invention, a nest of peening nozzles is collectively designated at 11. The peening nozzles are each of the general type described and claimed in co-pending application of the inventor, Harold W. Burney as Ser. No. 559,485 filed June 22, 1966 and entitled "Universally Adjustable Peening Structure" to which reference may be made for full structural details. The nozzles per se are not claimed in this application. They comprise, as particularly shown by FIGS. 1 and 11, a nozzle jet 12 supported from a generally U-shaped bracket or yoke 13 carried on the lower end of a tubular sleeve 14. The nozzle jet 12 extends outwardly from a central substantially cylindrical mixing chamber 15 into which shot are supplied from a hopper or supply bin 16 through tubular sleeve members 17. The sleeve members are supported in telescopic relationship to the tubular sleeves 14. Each tubular element 14 has an arcuate plate 18 at its lower end. The arcuate plates are shaped to conform to the generally circular outer periphery of the cylindrical mixing chamber 15. Each of the cylindrical shaped mixing chambers is supported by the U-shaped bracket 13 in any desired fashion, as by the schematically indicated fastening bolts 19.

The two telescopic tubular members 14 and 17 are held tightly together by a fastening clamp provided by the bolt 20 extending through projecting ears 21 on the lower tubular member 14. Tightening of the bolt obviously tightens the tubular member 14 about the telescoped tubular member 17 and thus sets the axial length of the tubular members.

Air or other fluid for forcing the shot outwardly from the chamber 15 enters through a port 27 and an air inlet hose 28. The upper tubular members 17 are secured to a ball-shaped member 29 having a generally square shaped internal opening (not shown) leading into the hopper or supply bin 16. Shot schematically indicated at 30, contained within the hopper or supply bin 16 then may enter into the interior of the ball-shaped member 29 to pass downwardly through the tubes 17 and 14 to the mixing chamber 15. The lower portion of the hopper or supply bin 16 has a multiplicity of circular openings 31, usually peripherally arranged about in its lower surface or bottom 32.

The spherical or ball-shaped members 29 are held adjacent to the openings 31 by support plates 33 (see also FIG. 12) which are generally of triangular shape and have a central opening of a diameter slightly less than that of the ball-shaped member 29. Thus, tightening the triangular plate 33 to the lower surface 32 of the hopper 16 draws the ball-shaped member tightly to the hopper and holds it in selected angular position relative to the hopper. The tightening is provided by tightening bolts 34 extending from the interior of the hopper to the lower side of the plate. By appropriate fastening, the tubular feeder supplies 17 and 14 may be held at any desired angle relative to the hopper so that shot for the hopper entering the opening in the ball-shaped member 29 will fall downwardly through the tubular member 17 or 14 and into the mixing chamber 15.

The ball-shaped member 29 and the tubular members 14, 17 may be turned to any desired rotational position about the axis of the tubular members prior to the tightening the fastening bolts thereby to align the nozzles or jets 12 according to any desired path which can be adjusted about the tubular axis. At the same time, the separating distance between the outer edge of the nozzle or jet 12 and any work to be positioned to be impacted by shot ejected therefrom (this will later be discussed) can be determined. The angle to which the nozzle or jets 12 may be adjusted is determined by the fastening bolts 19. These bolts may be loosened and tightened when the nozzle and its mixing chamber 15 are turned about the bolt as a center thereby to permit limited degrees of rotation in each of a clockwise or counterclockwise direction. The arcuate plate 18 has an opening therein leading into an opening of the upper section of the mixing chamber 15 so that shot from the tube 14 can enter into the mixing chamber. The extent of the arcuate covering of the cylindrical portion of the mixing chamber by the arcuate plate determines and limits the angle to which the jet may be turned.

Figure 12:
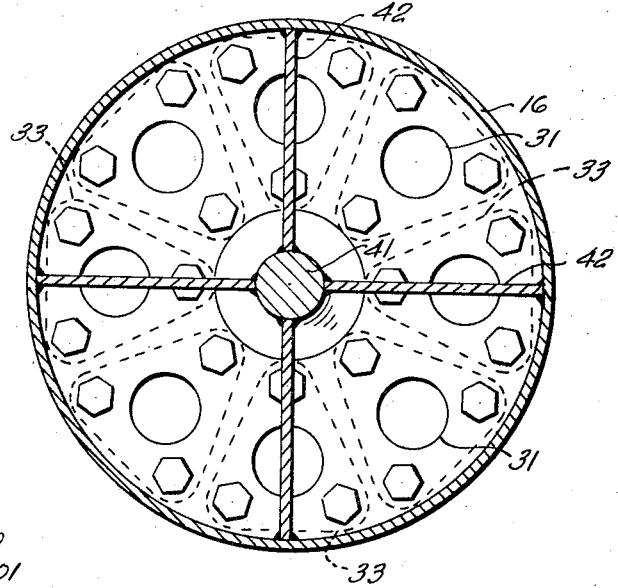
FIG. 12 is a sectional view taken approximately on the line 12—12 of FIG. 11 to show the positioning and support of the several peening nozzle supplies.

The foregoing constitutes a discussion of the general arrangement of the jets per se. Making reference again to FIG. 1, it can be seen that the jets, which may be of any selected number (here shown as eight) are supported directly from the hopper or supply bin 16 by the fastening support plates 33. They are, accordingly, adapted to move up and down with any movement of the hopper. The hopper structure 16 carrying the nozzles or jets 12, as can be seen particularly from FIGS. 11 and 12, is secured to a central shaft 41 by way of the radially extending arms 42 which are welded at their outer end to the inner wall of a generally cylindrical hopper member and at their inner end to the central shaft 41. The central shaft 41 terminates in a generally bell-shaped member 43 which is welded also to the bottom surface 32 of the hopper. The bell-shaped member 43 is preferably hollow, thereby reducing the weight within the hopper and precluding shot from filling the central area from which it would find no ready egress with the openings 31 generally peripherally positioned. The shaft 41 extends through a bearing member 44 and terminates interiorly of a second bell-shaped member 45 in substantially a thrust bearing structure schematically represented at 46. The shaft 41 is threaded at its outer end and secured to a fastening nut 47 thereby to hold the assembly together. The outer portion of the bearing 44 is fastened to a generally yoke-shaped element 48 formed at the outer end of a bracket 49. The yoke 48 is preferably welded at its edges to the bearing section 44 thereby to support the structure from the bracket 49.

The bracket 49 is secured as a generally cantilever type holder from a support plate 50. The support plate 50 is clamped to an elongated fastening plate 56, on the opposite side of which the cover plate 57 is held. The elements are securely fastened together, as by the indicated bolts 58 at the top and bottom. An opening is provided through the elongated plate 56 through which the tie rods 59 are passed. The tie rods 59, as can be seen particularly by FIG. 1, fasten at each end into a bracket structure 60 by which the assembly is raised and lowered.

The bracket structure 60 is preferably essentially in the form of a tubular element positioned to surround a cylindrical frame member 61. The stub members 62 are secured to each of the bracket members 60. The stubs connect with the tie rods 59 that are held between the support plates 50 and 57 which, in turn, support the bracket 49 holding the hopper and the nozzles.

In any peening operation, a substantial amount of dust and dirt is inevitable. The bracket structures 60 are arranged to slide up and down on the cylindrical frame members 61. In order that these members may slide readily, the region of the cylindrical frame member between the bracket structure 60 and its upper support end 62, as well as the lower support end 63, are, therefore, covered by boot structures 64 and 65 at the upper and lower end. The boot structures are secured to the upper and lower fastening members at one end and to the bracket structure 60 at the opposite end. Then, when the bracket moves up or down, as the case may be, the boots which house the cylindrical frame member or guide rods 61 either expand or compress while permitting ready movement of the bracket members.

As above noted, the peening nozzles or jets are supported from the hopper structure 16. The hopper is carried by the bracket structure which is slidable upon the cylindrical frame members 61. It is desirable that the peening apparatus be moved up and down while the peening operation is under way. The up and down movement is achieved by a suitable form of drive provided from a driving motor. This is achieved by supporting an upper shaft element 74 in bearings 75, 76 held at either side of the housing structure 77, 78 respectively. A similar lower shaft 79 is mounted in bearings 80 and 81 at the left and right side of the frame 77 and 78, respectively. A pulley wheel 82 is carried at each end of the upper shaft 74. A similar pulley 83 is carried at each end of the lower shaft 79. Because the structure comprising the frame and the hopper loaded with the shot and carrying also the jets and nozzles is heavy, it is desirable that the upper and lower pulleys be ribbed or notched thereby to be formed essentially with teeth 84, as indicated. A timing belt 85 having an internal ribbed section for engagement with the teeth 84 is tightly looped over each of the pulleys 82 and 83 which elements may be tightened by a slight bearing adjustment until the correct tension is provided on the belt.

Drive for the pulleys and, thus, the belt, is provided by way of a schematically represented drive motor 86 supported upon the upper surface 95 of the housing. Suitable gearing between the motor and a driven pulley 96 is established through a schematically represented gear box 97. This gearing provides a suitable drive speed for the pulley 96 and, by way of a belt 98 wrapped about pulley 96 and a second pulley 99, the upper shaft 84 is turned. The pulleys may be keyed to the shaft 74 thereby to rotate the shaft and, with rotation of the drive pulley 99, the upper pulley elements 82 may be driven thereby to drive the belt 85.

The belt 85 may be driven in either of two directions, that is in such a way that the drive is obtained by a clockwise or a counterclockwise rotation of the driving pulleys 82. The drive belt is clamped to the bracket structure 60 by way of a pair of plates 100 which clamp around the belt and fit tightly therewith. As the arrangement is shown (see FIG. 3 for instance) a clockwise rotation of the upper shaft 74 will force the right side of the belt 85 downwardly and, with it, the clamp and bracket structure 60. This action lowers the position of the hopper 16 and the therewith associated jets and nozzles. A counterclockwise rotation of the shaft 74 and, with it, the drive pulley about which the belt 85 is wrapped, will raise the hopper 16 and the bracket structure therewith associated as well as the nozzles secured from the hopper.

With the peening operation to be carried out in such fashion that the peening nozzles or jets move up and down across the work (as will later be explained) movement of the bracket structure 60 to each of two limiting positions is used to provide a drive control for the motor 86 thereby to reverse its direction of rotation at the end of each stroke. The drive control is established through a limit switch rod 101 which is positioned at its lower end in a bracket 102 and held slightly spaced therefrom by a spring element 103 and a collar 104. The upper end of the rod 101 is arranged to slide through an opening in the upper surface 99 of the housing and there terminates in a U-shaped bracket 105 which connects to the arm 106 of the limit switch 107. A bracket 108 extends outwardly from the bracket structure 60 and the limit switch rod 101 is arranged to pass therethrough. A suitable collar 109 attaches about the limit switch rod above the bracket 108. A similar collar 110 attaches to the limit switch rod 101 below the bracket 108.

Thus, as the feed hopper 16 is moved up and down by the belt 85 as the latter is attached to the bracket structure 60, an upward movement to the point where the bracket 108 contacts the collar 109 and the rod 101 will raise the limit switch 105 thereby to reverse the direction of rotation of the motor 86. Similarly, a downward movement of the bracket 108 to contact the collar 110 will draw the rod downwardly against the force of the spring 103 and move the switch arm 106 in the opposite direction to reverse again the direction of the motor. Thus, the motor 86 is arranged to drive through the belt and the connections in such a way as to progressively raise and lower the hopper 16 and the nozzles and jets therewith associated to various up and down positions adjacent to the work to be operated upon.

The movement of the hopper 16 up and down along with its frame support carries the nozzle jets 12 up and down across the work since each of the nozzle jet systems is carried from the hopper. The shot which are ejected from each of the nozzles are supplied into the hopper 16 from a main storage hopper 111. The main storage hopper is kept supplied with shot through a supply duct 112, which will later be discussed. At the moment, it may merely be noted that the storage hopper 111 has its lower portion formed from a pair of sloping plates 113 and 114 which lead into a plurailty of outlets 120. A feed gate 121 (later to be discussed in detail in connection with FIG. 13) is included in each supply path to supply shot from the storage hopper into the flexible inlet tubes 122 which are held in related location by a bracket 123 and which then supply shot into the feed hopper 16.

The flexibility of the supply tubes 122 permits the up and down movement of the hopper 16 without displacing the tubes. The tubes are sufficiently long that even with the feed hopper 16 at its lowermost position, they terminate interiorly thereof and are held in generally a desired location relative to the hopper by the positioning bracket 123. With up and down movement of the hopper, the same movement is effected in the bell-shaped member 45 and, with it, a corresponding movement in the rotatable shaft 124 secured thereto. The shaft 124 extends upwardly through the upper surface 95 of the housing and is guided therethrough in a bearing element 125. In addition, because the shaft extends a substantial distance above the upper surface 95 of the housing, it is held in slidable relationship by a bracket and bearing 126 supported and carried from the upper portion of the storage hopper 111. A guide bracket 127 is tightly secured to the rotatable shaft 124 at a point slightly above the upper surface of the housing 95. A roller 128 is attached to the outer end of the bracket 127. The roller is adapted to be fitted within a cam track 129 of a barrel cam 130 that is suitably bolted by fastening bolts 131 or otherwise fastened to the upper surface of the housing 95.

It may be noted (particularly from FIGS. 1 and 3) that the barrel cam is substantially a hemi-tubular element which fits about the shaft 124. The cam track 129 is made of a width approximately corresponding to that of the roller 128. The track has a pitch which will cause the shaft 124 to turn back and forth as it moves up and down. With the roller being secured to the shaft 124 being obliged to follow in the cam track 129, it necessitates a turning back and forth of the shaft 124 about its axis. This turning is then transferred through the bell-shaped member 45 and the fastening nut 47 to the hopper 16 and, with it, to all of the group of jets. The result is that as the jet nozzles move up and down, they are also subject to an oscillation over a selected arc (determined by cam 130) about the shaft axis 124. In this way, the peening effect is carried over a wider area and range of the work 136 which is to be peened. By reason of the fastening provided by the fastening members or bolts 131, into the upper surface of the housing 95, the barrel cam 130 may readily be removed and another type cam substituted. The substitution of one cam for another, it will be appreciated, is adequate to provide for either more or less rotation or oscillation of the nozzle jets 12. The omission of the cam 130 will permit straight up and down movement without nozzle rotation. The movement and rotation thus can be made selectable in accordance with the type of work to be done.

Various arrangements for supporting the components 136 to be peened may be utilized. It has, however, been found to be particularly desirable to provide for supporting such components upon a turntable structure schematically represented at 137. The turntable preferably is formed with a pair of concentrically arranged guide elements 138 and 139 which are raised relative to the central section. The guides are held in the established relationship by brackets 140 which are, in turn, firmly fastened to a central shaft 141 which supports the entire turntable assembly. The turntable structure is hung from a support flooring 142 in the housing and is carried in suspended arrangement from a shaft 143 having an end flange 144 that is brought into abutment with a similar flange 145 at the end of the shaft 141. The two flanges are securely bolted together as schematically indicated at 146. Both support the turntable proper from the main shaft 143 and also permit rotation of it. The shaft 143 terminates at a bearing element 147 secured to the support flooring 142. It is controllable from an indexing mechanism schematically represented at 149 in FIG. 3 and shown in further detail by FIG. 8. The indexing mechanism is driven from a motor 149 which is speed controlled relative to the drive motor 86 for controlling the up and down movement of the feed hopper 16 and the therewith associated nozzle jets. Further discussion of the indexing mechanism will later be given. Suffice it at this point to state that the unit provides for rotating the turntable 137 in a selected fashion providing step-by-step movement thereof coordinated with any selected number of up and down and oscillatory movements of the nozzle jets. Movement of the turntable normally occurs while the nozzle jets are moved upwardly to the limit position where they are stopped while the turntable is rotated with the supported work. At this time, the work which has been treated is moved away from the jet position and new work moved to a position for peening.

In one form of the operation, it may be assumed that the work 136 to be peened is in the form of a blade used in connection with water or steam turbines or the blades of a jet engine, as in jet engines for aircraft. Such blades are curved according to a multiplicity of curvatures and turns. They usually extend outwardly from a root section where they are designed for securement to the drive shaft. The blades are formed of various thicknesses from the root section out to the tips and at various thicknesses and configurations in the transverse dimension as well. For these reasons, in the peening operation, it is frequently desirable that the quantity of shot directed from the nozzle jets 12 to the work 136 shall be controlled so that for any given time period, a greater quantity of shot may reach certain parts of the work at a higher velocity than the quantity which reaches other parts at a lower velocity.

The pressure or velocity at which the shot are projected toward the work may be appropriately controlled by the nozzle shaping. As was explained in the above mentioned co-pending application of this applicant, the nozzle jet 12 may have its orifice appropriately formed to take into account the type of work being treated. In one particular form, the peening nozzle jet may approach rectangular shaping or, it may be generally elliptical in shape, as contrasted to the circular opening jet heretofore customarily used in such operations.

With the nozzle jets 12 arranged in the pattern above discussed and suggested by the arrangement of FIG. 12, it can be seen that the work, carried upon the turntable 137 and held between the guide elements 138 and 139 in the different segmental areas 157, can be moved closely adjacent to the nozzles and impacted by the ejected shot from each side. The work 136 is preferably held in work support units 158, later to be discussed. These work support units are positioned between the guide elements 138 and 139 and also between the bracket members 140 thereby to be wedged or held firmly in the desired support position. The central portion 159 of the turntable 137 is provided with a mesh screen covering 160 having in it openings of a size to permit shot that has impacted the work 136 to fall backwardly through the mesh for return to the storage hopper in a fashion later to be explained. The mesh 160, however, is desirable because it is of a fineness adequate to prevent larger parts or even the work itself from falling into the collection bin and hopper. Likewise, it precludes any of the workmen's tools for instance being lost interiorly of the machine while securing the work to the turntable for peening operation and later, removing the work after the peening operation has been completed.

In any peening operation, a substantial portion of the shot used is reusable if cleaned and recirculated. The screening material 160 permits shot of selected size which impact from the turntable side to fall through the turntable into a collection supply hopper section 161. Shot from points external to the turntable periphery can fall directly into the collection hopper 161. This hopper, like other hoppers, is provided with sloping sides 162 to permit any shot collected to be redirected into an oscillating conveyor 163. The oscillating conveyor is a generally standard type of component which operates in a more or less eccentric fashion whereby after it receives shot falling upon its upper surface 164 from the supply section 161 moves the collected shot, as a result of the generally rockerlike motion of the frame about the support axle, across a pair of trough members 166 and 167 from the latter of which the shot is permitted to fall through an opening 168 leading into a cleanout section 171 at about the lowermost point of the apparatus.

Figure 7:
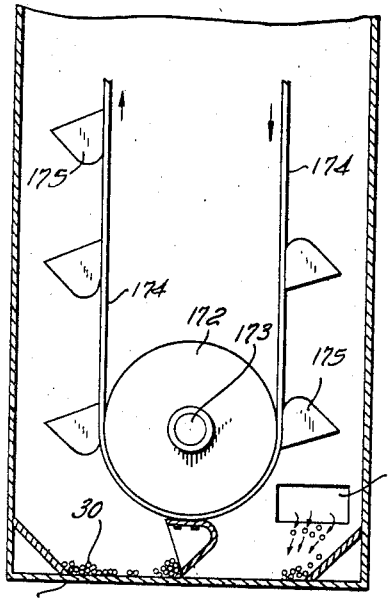
FIG. 7 is a partial sectional view of the bucket conveyor belt structure adapted for transporting used shot to the storage hoppers and cleaning component.

As can be seen particularly by FIG. 7, the cleanout section 171 is located to the side of the machine and in a region whereof a pulley element 172 is positioned. The pulley 172 is carried upon a shaft 173 that is supported in the lower portion of the housing. There is a second shaft (not shown) at the upper portion of the housing and a conveyor belt 174 connects the two drive pulleys together. The belt 174 has cup members 175 secured to it and spaced about it. Rotation of the drive shafts as provided from the upper driving shaft is controlled from the driving motor 196. This motor is used also for driving the timing belt controlling the up and down motion of the feed hopper 16. With the conveyor driving in the indicated direction, the slot 30 which collect in the cleanout section 171 are scooped into the individual cup members that are secured to the belt. The shot are then conveyed upwardly to be dumped at the top of the motion path into the shot conditioner apparatus 180 supported in any desired fashion at the top of the apparatus.

Figure 6:
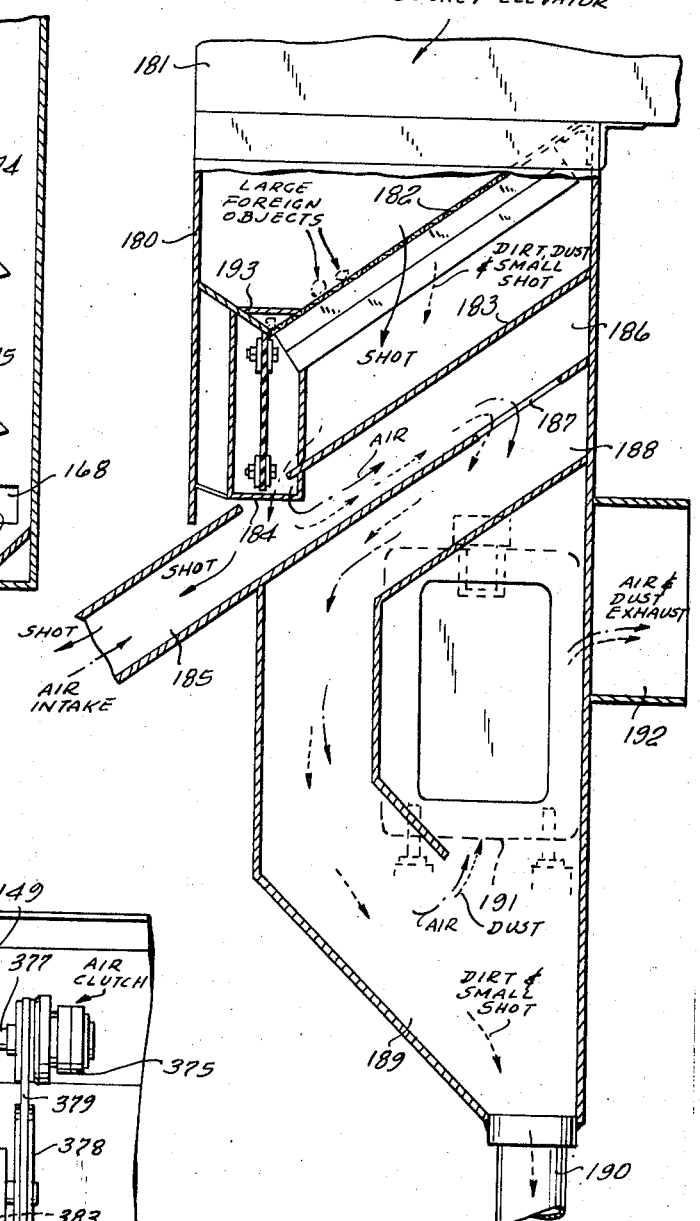
FIG. 6 is a detailed showing, partly as a sectional view of the shot conditioner taken substantially on the line 6—6 of FIG. 5, looking in the direction of the arrows.

A somewhat detailed showing of this unit is found in FIG. 6 where the shot released from the buckets 175 at the turnover to the down track are dumped into the collector section 181 to pass across the foraminate screen surface 182 whose openings are all of a size adequate to permit the desired shot size to fall therethrough and onto a collector plate 183 leading through an opening 184 into an outlet duct 185 which terminates at the supply duct 112 (see FIG. 3) for entrance into the storage hopper. The plate 183 is sloped downwardly so that the shot passed through the screen pass by gravity through to the outlet duct 185. At the same time, the air is drawn inwardly within the upper portion 186 of the duct 185 in a quantity sufficient to draw the accumulated dust or dirt accompanying the shot through the duct portion 186 and through the opening 187 into a second section 188. The resultant reduced pressure is adequate to draw extremely small size shot upwardly through the upper duct portion 186 along with the dust, dirt, grit and the like. This more or less refuse material then moves into the section 188, which is also sloped, as indicated. These particles move by gravity and the reduced air pressure is effective downwardly through the collector area 189 so that solid material falls through a collector tube 190 from which they can later be cleaned out. At the same time, the exhaust dust and air is drawn upwardly through the opening 191 and into the outlet tube 192. The suction motor (not shown) is housed in the opening 191. Larger foreign objects which may be collected and carried upwardly by way of the cup members 175 are caught by the screen 182 and collected in the bottom section 193 of the component from which region they can readily be removed through an appropriate outlet door schematically represented at 199.

Figure 13:
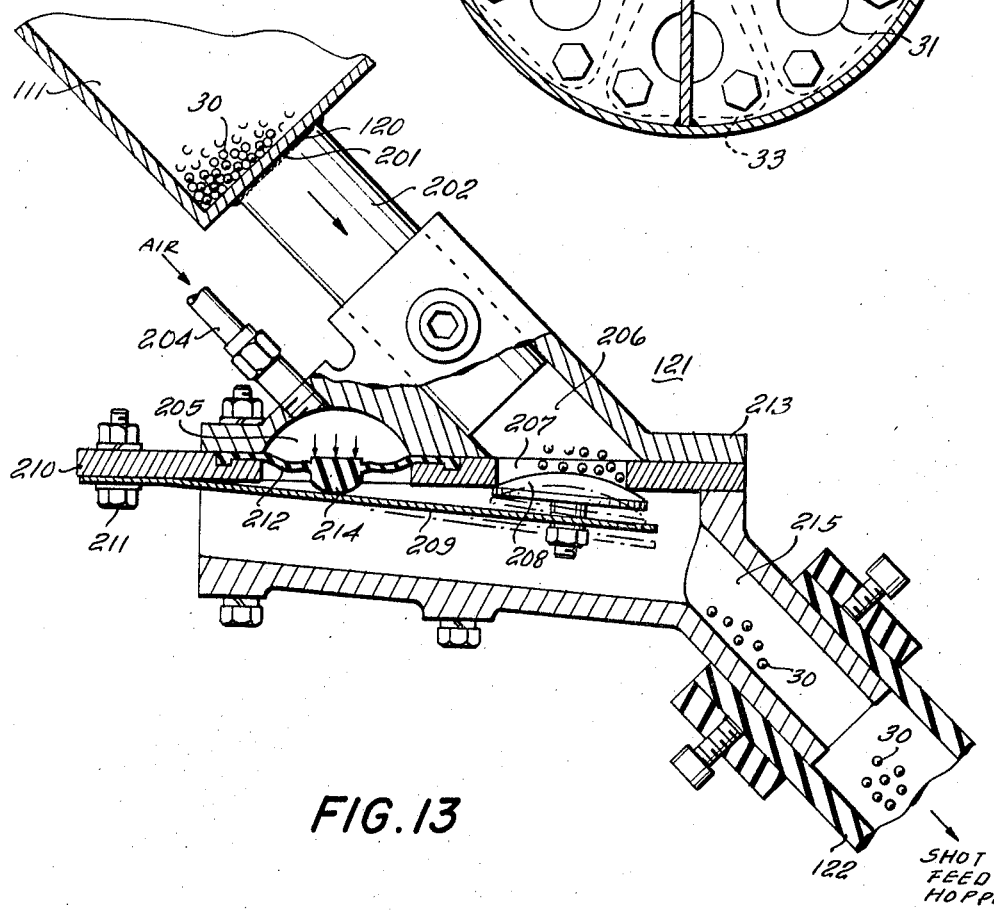
FIG. 13 is a sectional view taken approximately on the line 13—13 of FIG. 1 to show the air gate and shot supply control for feeding the hopper for the multiple peening nozzle structure.

Now, making reference to FIG. 13, the shot which have been collected in the storage hopper 111 feed through the outlet 120 and are again screened by a screening element 201 as they pass through an inlet tube 202 to the feed gate, generally designated 121. The feed gate essentially provides a metering component by which the rate at which shot are dispensed from the storage hopper 111 to the feed hopper 16 may be controlled from a central control point for which a control box 203 (see FIG. 1) is provided for controlling all of the air supply, the electrical circuits, and the indexing rate. In this instance, air under pressure developed at any desired point (not shown), which may be the same point as that from which air is supplied to the inlet tubes 28 leading to the various nozzle jets 12, is supplied to an inlet tube 204 leading into an air controlled chamber 205. The shot moving by gravity through the inlet tube 202 enter into the interior chamber 206 of the feed gate 21 and tend to collect above an opening 207 at the bottom of which the closure disc 208 is resiliently held. The disc 208 covers the entire area of the opening. The disc is secured in any desired fashion at one end of a resilient flat spring member 209 which is supported at its opposite end by the frame 210 of the feed gate 121. The flat spring member 209 is normally sufficiently stiff that when it is clamped and secured to the frame member 210 by the fastening bolt 211, or any other equivalent means, it will tend to force the closure disc 209 across the opening 207 thereby to preclude feeding shot from the storage hopper 111 downwardly into the supply tube 122 to the feed hopper 16.

At times when it is desired to feed shot from the storage hopper air under pressure is introduced from the tube 204 into the chamber 205. The air pressure acting against the upper side of a diaphragm element 212 controls the opening and closing of the shot supply path into the tube 122. The diaphragm 212 usually has a central button-like section 214 which is adapted to rest against one side of the resilient flat spring member 209. With the introduction of air pressure within the chamber 205, the diaphragm forces the spring member downwardly against the clamping force exerted by the fastening element 211. It is this action which opens the passageway 207 by removing the closure disc 209 therefrom. At this time, shot collected in the storage hopper 111 may pass through the outlet element 215 and into the feed tube 122 which is clamped in any desired fashion as shown to the outlet element. Normally, it is desirable to vent the chamber 205 thereby to remove pressure therefrom upon cut off of the air supply within the tube 204. Any and various means suitable for this purpose may be utilized so that none has been illustrated. Removal of the air pressure from within the chamber 205, as by leakage, permits the flat spring member 209 again to close the disc 208 against the opening 207 and cut off the supply. This type of feed gate has the advantage of controlling the supply within the feed hopper and preventing overloading at times when work pieces are being changed and during the period when the indexing operation is cut off. The control may also be used to advantage at times when a slower rate of feed than would normally be provided is desired.

Peening operations of the character herein described tend to be dirty and dust-producing at times. To this end, it is usually desirable to have the complete apparatus housed within a housing framework serving to close off the entire unit. However, for inspection purposes, various openings are usually provided into the framework and within the housing as illustrated by the various doors adjacent to the frame proper. For convenience, many of these closures are schematically shown by the drawings, but, where omitted, the absence of closures is for convenience.

The operation of the apparatus hereinabove discussed provides control of the peening operation with full coordination between it and the work movement. Each reciprocation of the nozzle structure, and with it, the hopper 16, produces an actuation of the limit switch structure 107. As will be recognized also from the reference later to be made to FIG. 16, each operation of the limit switch structure 107 produces an operation of one or the other of the switches LS3 and LS3A. This, in turn, as will be explained, actuates a counter coil (see FIG. 16) which, after a selected number of reciprocations, controls the operation of an air clutch 375 thereby to connect the drive roller on the shaft 377 to motor 149 to drive the pulley 378 through the belt 379 (see FIG. 8). Operation of the drive through pulley 378 controls an indexing unit schematically represented at 381.

The indexing unit may be of any desired and well known type which functions in accordance with the up and down movement of the peening apparatus itself. While the indexing device is not illustrated in detail, reference is made to the fact that this unit may be of any well known type, illustratively such as that which is known as a "Series G With a Reducer," as described and pictured in the catalog of the Commercial Cam and Machine Co. of 400 N. Ashland, Chicago, Ill. 606022, the same being Catalog No. 400, copyright 1964, with a suitable form of indexing unit shown at page 24 thereof. Other and similar types of indexing units may be utilized where desired.

Operation of the drive clutch to drive the indexing unit 381 causes the cam element 383 to rotate with the shaft 384 which is driven through an appropriate gear reduction unit. Cam followers 385 and 386 are supported adjacent to the cam periphery so that, with rotation of the cam, one or the other of two limit switches LS1 and LS2 is actuated at each position of maximum cam eccentricity (see also FIG. 16). The limit switches are activated at each up and down reciprocation of the peening nozzles. The system counts the number of reciprocating strokes. Following a selected count, the indexing unit (see FIG. 8) causes the work-holding turntable to advance one step. The advance occurs while the peening nozzles are in their uppermost position and the peening operation is arrested. Illustratively, with rotation of cam 383 being such that the limit switch LS2 is actuated, it, as can be seen from FIG. 16, energizes the coil CR3A. This, in turn, activates the relay CR3 in the lines to CR4A and CR4B and the connections leading to the conductor 228.

Then, with the limit switch LS2 thus tripped, it opens the circuit to the counter clutch 255 and the counter then resets to a normal position. This occurs with the peening nozzles in the most upward direction and position. Resetting causes the air to be turned off, as will be explained with respect to FIG. 16.

When the cam 383 continues to rotate, it trips the limit switch LS1 and this then causes energization of the relay CR4 through the coil CR4A. Further operation is explained particularly with respect to FIG. 16 and need not be dealt with further at this point. Suffice it to say here that as the limit switches LS1 and LS2 are operated, they, in turn, energize stepping mechanism within the housing 387 whereby the shaft 143 is turned or stopped through a limited angle of arc while suspending the turntable 137. The turntable, as explained in connection with FIG. 3, is hung freely from the element 387 and is sufficiently heavy that when loaded with work 136 or unloaded, it retains its precise location relative to the peening nozzles. Each time the shaft 143 is turned through the selected angle, the peening nozzles are all in their upward position so that the work carried by the turntable is out of the way of the peening nozzle.

With the conclusion of the limited rotation produced following each count, the operation automatically restarts and the peening continues with the various components operating as before. The indexing unit is set so that it may provide either single or double indexing as is explained also in connection with FIG. 16.

Figure 10:
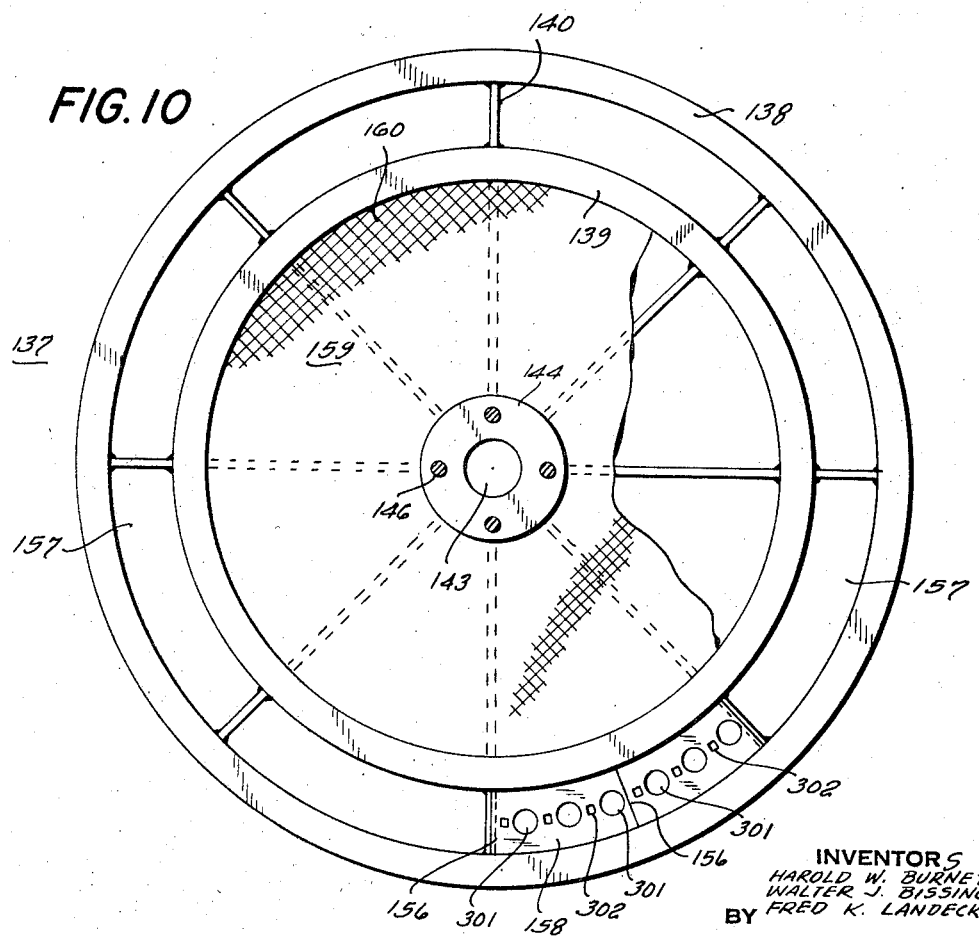
FIG. 10 is essentially a plan view of the turntable shown by FIG. 9 taken approximately on the line 10—10 thereof to show the sections for the work supports holding the articles for the delivery to the peening apparatus.

The work-holder components 158 have been schematically represented in FIG. 10. Further details of these holders and the manner of positioning them relative to the turntable are set forth by the showing of FIGS. 14 and 15 which represent two different stages in the operation. Referring to FIG. 14 first, the work 136 is here assumed to be in the form of a turbine or compressor blade. The blade is adapted to be supported both at its top and bottom during the operation.

If reference is made first to FIG. 14, the work-holder component 158 may be assumed to be in the form of a rubber block whose inner and outer edges are curved to correspond to the inner and outer periphery of the guide elements 138 and 139. The ends 156 of the work-support units are generally of radial formation to fit between the brackets 140. Each work-support unit 158 has generally circular work-locating openings 301 at selectively chosen spacings between the end portions. Adjacent to the work-locating openings 301 are certain generally square openings 302 in which a supporting post member 303 is adapted to be positioned.

A foil tool schematically represented at 305 is adapted to be positioned in each of the openings 301 and to extend therein for at least a part of the depth of the work-holder 158. The foil tool extends above the upper surfaces of the work-holder 158 and is generally opened to some extent on top so that the lower edge 307 of the work 136 can be rested therein. In this position, the blades located (as shown by FIG. 11) in two of the foil holders arranged in two of the openings 301 extend outwardly and above the work-holder proper. It is desirable to extend a square rod or post 303 through one of the square openings 302. This post has a collar 308 secured near to its lower end portion. Between the collar 308 and the lower surface of the work-support 158, it is desirable to position a spring member 309 tending to force the collar downwardly from the lower portion of the work support. The square post 303 protrudes through the opening 302 and above it. A second collar 310 is positioned about the post 303 on the upper side of the work-support 158. The collar is secured to the square post to provide the desired tension in the spring member 309.

The upper end 310 of the square post 303 is formed as a bifurcated member with two wire spring members 312 and 313 secured thereto by the fastening pin 314. The wire spring members are bent generally in right angle form and extend outwardly from the bifurcated end 310 to a position generally above that of the work-piece 136.

A hold-down plug 315 usually formed also of hard rubber is positioned over the outer edge of the work-piece 136. The hold-down plug, as shown particularly by FIG. 14, is formed with a generally conical interior section so as to permit it to hold tightly to the upper portion of the work-piece when pressed downwardly against it. A fastening collar pin is appropriately secured within the upper portion of each hold-down plug 315 in any desired fashion (not shown). This pin then generally is provided with two collar-like portions 317 and 318. The outer ends of the wire spring members 312 and 313 are generally formed in hook-like fashion so as to curve around and hook between the collar-like members 317 and 318 thereby to locate the hold-down plugs relative to the outer end of the work 136.

At the same time, the force of the spring 309 tending to pull the square post 303 downwardly causes a tight positioning of the work 136 within the holder plugs 305 and 315 in order to permit the peening operation.

The fastening element provides a quick release component, with the quick release provided by merely an upward pull on the square post 303 or an upward force on the collar 308 against the force of the spring 309. Only a slight upward movement of the square post 303 is sufficient to move the hold-down plugs 315 away from the outer edge of the blade 136 to an extent sufficient to permit its removal from the fastening component. The structure also provides a quick loading arrangement since the work (herein illustratively assumed to be turbine or compressor blades) to be peened is first positioned in the foil holder 305 and then fastened at the outer ends in the manner already explained. When the work is removed from the work-support units 158 subsequent to peening, new work can be promptly inserted therein for peening.

As can be seen from FIG. 14, the outer end 323 of the blade or work 136 in its initial position protrudes very slightly within the holder block 315. It thus is protected during the peening operation while the work is held in the work-support unit 158 and carried on the turntable into the region of the nozzles. Only that portion of the blade or work 136 which is between the blocks 305 and 315 is peened. The outer end 323 of the blade 136 usually does not require peening so that the holder provides also a protective cover for the outer end. The outer end of the blade represents a low work-load region of the blade 136. The root section 325 of the blade takes a substantial load. Therefore, it is desirable to provide for peening this section also.

In the supporting of the blade in the foil tool or block 305, the root section, as can be seen in dotted outline in FIG. 14, is below the top of the foil 305. To reach this section of the blade, and following the peening of the blade as a whole in the support of FIG. 14, the blade is removed from the holder structure of FIG. 14 and reversed in position to that shown by FIG. 15.

In FIG. 15, the work-support unit 158 with the openings 301 and 302, as already described, is again used for blade support but with the blade reversed in a position with the smaller end positioned through a central opening in the root tool or block 331 which itself is positioned within an opening 301 of the work-support unit 158. The root tool or block 331 is provided with a rim 332 which rests on the upper surface of the work-support unit 158 and thereby establishes the positioning of the unit as a whole. The inner portion 335 of the root tool or block 331 is of a diameter corresponding substantially to that of the opening 301 so that a reasonably tight fit is established. In positioning the blade or work 136 within the root tool or block 301, the blade is passed through the unit and the work-support unit 158 to the position generally designated. At this time, a locating plug 336 is positioned adjacent to the root end of the blade substantially as depicted by FIG. 15.

This locating plug is of hard rubber, as is the root tool or plug 331. A central pin member 337 is molded within the plug 336. This pin member is threaded at its outer end 338. With the positioning of the work element 136 between plugs 331 and 336, a square rod is positioned to extend through the square opening 302 and to protrude therethrough for any desired distance. Above and below the work-support unit 158, there are collars 341 and 342 thereby to locate the square rod or post 340 and to set the height of it above the work-support unit 158. A threaded member 345 is fastened at the top of the square post or rod 340. A spring 346 surrounds the threaded member and is rested at its lower end against a flat spring 347 which has a central opening through which the threaded member 345 extends. The tensioning of the flat spring member 347 against the top of the square shaft or post member 340 is set by turning the tightening nut 348 to any tension desired. The outer end 350 of the flat spring member 347 is provided with a slot or a central opening through which the threaded member 338 is extended. At either side of the outer end of the flat spring, suitable fastening nuts 351 and 352 are positioned so that the rubber block or cap 336 may be tightly held to the outer end of the blade 136. Tightness is established by the fastening nut 355.

With this holding structure in place, the turntable may carry the work within the range of the peening nozzles and that part of the work between the root tool or plug 331 and the cap 336 will then be peened. To remove the blade or work 136 from the turntable structure following peening, the operation is extremely simple, as was the case with the holder of FIG. 14 for the opposite end of the work. The removal is achieved by pulling upwardly on the flat spring 347 to an extent such that the rubber cap 336 is released from the inner end of the work blade and the element swung around to free the blade after which the blade is removed from the root tool 331.

In the event certain portions of the work are to be protected from shot impact during the peening operation, or a part of it, that part may be protected by a rubber boot or pad fastened thereto.

FIG. 16 is a schematic circuit diagram presented to exemplify in simple form the coordinated control between jet nozzle movement, the work indexing and the overall machine operation. In this respect, it should be noted that the work W (usually identified as 136) on the turntable is indexed to a position whereat it may be peened by the shot ejected from the nozzle structures (see, for instance, FIG. 11). Following peening, the turntable is stepped ahead and the work is moved out of the path of the nozzles and then a new work-piece is substituted. As already explained, the nozzle jets are reciprocated and oscillated or turned relative to the work, with a selected number of nozzle reciprocations provided between each shift or indexing of the work-holding turntable. During the time period when indexing occurs, the nozzles are held in their uppermost position stationary above the work. Following the indexing operation, the nozzle motion is again started and the peening operation is continued.

Figure 2:
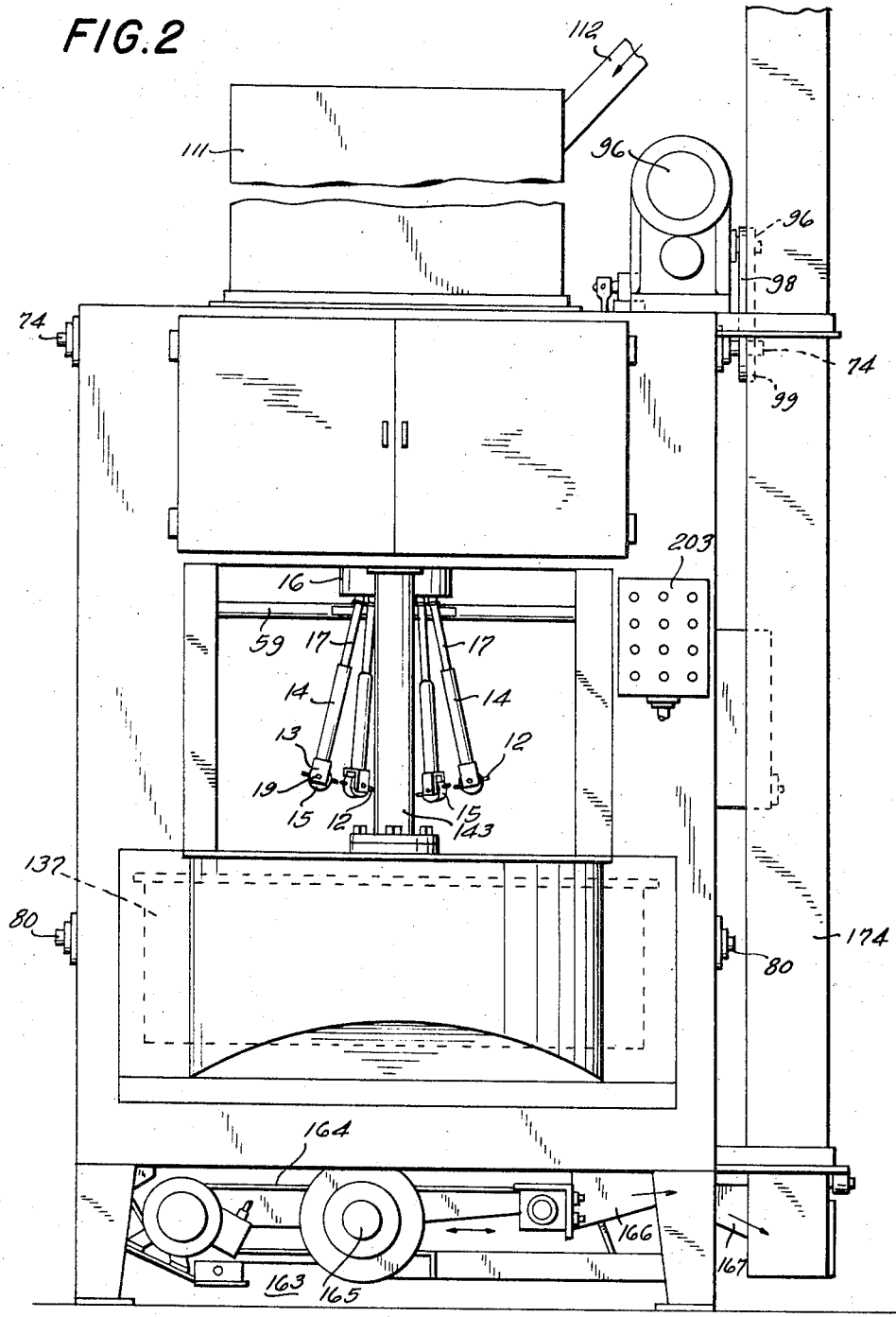
FIG. 2 is a rear elevational view, partly broken away, particularly to show the peening jets and their positioning within the apparatus.

The circuit diagram of FIG. 16 is schematic to show the control established from the panel 220 (see particularly FIGS. 1 and 2) which includes numerous start and stop switch elements adapted to initiate and arrest the operation.

If reference is made now to FIG. 16, it may be assumed that terminal points 227 and 228 indicate two terminals of power supply for the entire system. The diagram, for the sake of simplicity, may be considered as if connections to the terminal point 228 are common for all units and connections to the terminal point 227 will be as herein to be described. First of all, for initiation of the operation, the switch 229 is moved to a closed position, at which time, for the purpose of indicating that the system is in an operating state, the indicator lamp 230 is placed across the power supply lines and becomes illuminated. At the same time, it may be assumed that the emergency stop switch 231 is in a closed position, so that, following initiation of operation of the various components and energization of the various motors and relays to be discussed, power can be supplied to any of the control units. In starting, it is first desirable to initiate operation of the shot bucket conveyor or elevator 174 (see FIG. 7) carrying shot to the shot conditioner 180. This is established by the drive motor (not shown in detail in FIG. 2) which will here be identified for convenience as M2. Simultaneously, the motor 169 of the oscillating conveyor is started. This motor is designated on the circuit diagram as M3 for the sake of convenience.

This operation is normally initiated by the closure of start switch 232 thereby to close the circuit from the terminals 227 to 228 by way of the normally closed emergency stop switch 231, the closed stop switch 233, the start switch 232 into the motors M2 and M3 and, thence, to terminal 228 through the indicated conductor 232'. The operation is then followed by connecting the suction or blower motor M4 (here so designated for convenience) to withdraw dust from the apparatus (see FIGS. 4 and 5 where the motor is identified as 194). Closure of the second start button 234 will then initiate a current flow through the motor M4 by way of the normally closed stop switch 235 and the indicated conductors 234' and 256'. Likewise, in order to provide the required indexing, the indexing motor 149 (see FIG. 8), which will hereinafter be identified as M1 for the sake of convenience on the diagram, is started in operation by the closure of the start switch 240, it being noted that the stop switch 241 is normally closed. Starting operation of motors M2, M4 or M1 causes the holding contacts M2', M4' or M1' which shunt the start switches 232, 234 and 240 to close and thus provide a holding current to the motors as long as the motor operation continues.

Following the initiation of the operation of the indexing, elevator conveyor and suction motors, it may be assumed that the peening operation may be initiated. Air is supplied, as already explained to the peening jets from the manifold leading into the inlets 120 and the feed gates 121. These elements will not be further discussed at this point.

The starting of the peening operation initiating the cycle to control the turntable movement causes reciprocation of the peening nozzles to commence through the closure of the start switch components 242 and 243 which are connected together. Each connects through the normally closed stop switch 244 and the normally closed emergency stop switch 231 to one terminal 227 and, thence, through the relay CR1 which at its opposite end connects through conductor 256 to the terminal 228.

Energization of the relay CR1, through the closure of switch 243, causes contacts 245, 246 and 248 to close. Closure of contact switch 245 provides a "hold" which is effective to hold relay CR1 energized. Then, with contact 246 closed by relay CR1, a connection is made to terminal 227 and through clutch contact 248 and the normally closed switch 249 which lead back through the clutch 265 and conductors 249 and 256 to terminal 228.

In the line with conductor 250, the schematically represented solenoid 251 may be assumed to control the supply of peening air to the jets, as available through the inlets 120, already discussed. In this case, power is directed through the switch 246, as closed by the relay CR1, so as to flow through the motor M5DN and the indicated closed switches leading to conductor 256 and the terminal 228. Energization and connection to the motor M5DN, which in FIGS. 1 and 3 in particular is represented at 86, causes the drive for rotation of the upper shaft 74 to be commenced. This starts the peening apparatus in the down direction. In this case, it will be noted that the switch LS3 designated as the limit switch 107 (see FIG. 1) will next be operated for movement in the opposite direction by the collar 110 contacting the bracket 108 to draw the switch arm 106 down.

As FIG. 16 has been shown, the limit switch LS3 is in its upper position so as to permit energization of the motor M5DN (this is motor 86 of FIG. 1) in a direction to start a downward movement of the nozzle jets. At the time when the limit switch is operated by reason of the downward movement of the bracket 108 contacting the collar 110, the limit switch LS3 is moved to its lower contact point whereupon motor M5UP is energized and current to the motor M5DN is interrupted. This reverses the direction of the up and down movement of the peening nozzle group, as already explained. Then, upon reaching the uppermost position so that the bracket 108 contacts collar 109, the limit switch LS3 will again be moved to the upper position and motor M5 will operate in the state of motor M5DN and the downward movement will again commence. It will be understood, of course, that this control is established by suitably arranged windings (not shown) within the motor whereby with current flowing through the indicated motor M5DN, the upper shaft 74 serving as the drive will turn in one direction whereas with current flowing through the motor M5UP, the reverse condition will occur. In each instance, the nozzles travel down with motor M5DN energized until the conditions stated occur for which the upward movement is commenced and, with this, the counter is energized.

Figure 8:
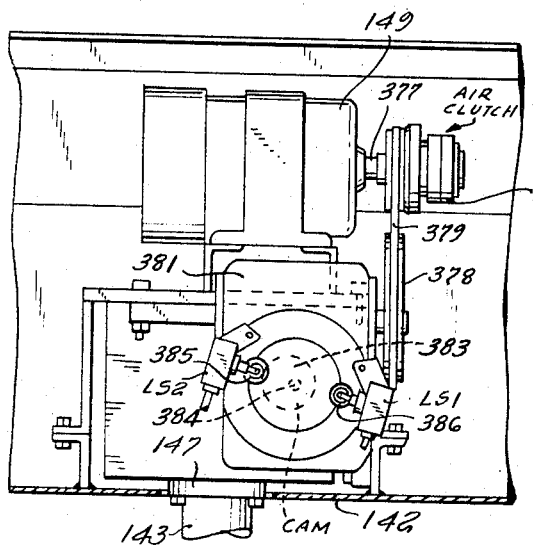
FIG. 8 is an elevational view of the indexing drive system taken on the line 8—8 of FIG. 3 and looking in the direction of the arrows.
Figure 9:
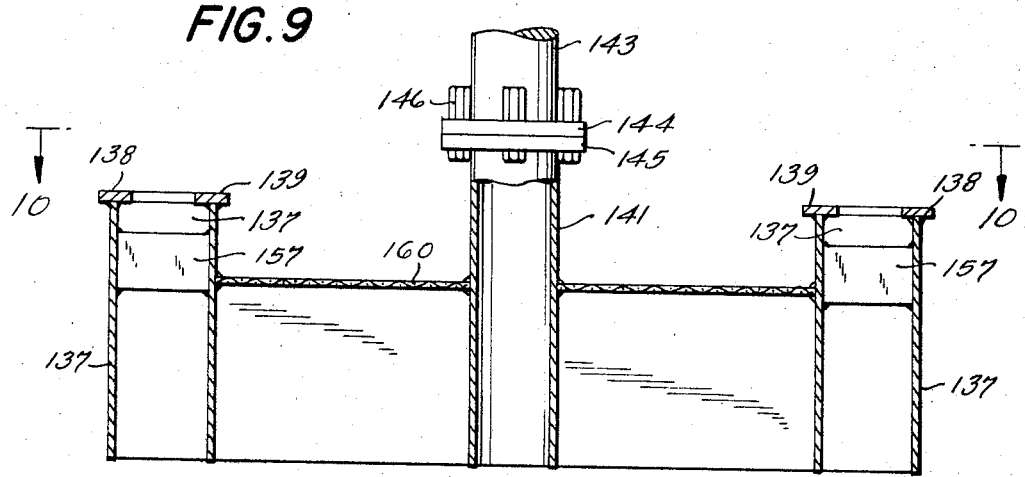
FIG. 9 is a view in section of the turntable for supporting the work, the view being taken on the line 9—9 of FIG. 3, looking in the direction of the arrows.

At the same time that the movement of the peening jets in one direction occurs, the counter circuit provided by the count coil CC is energized. This is provided through the opening of the circuit provided from the terminal 228 through conductors 256 and 249, the count coil CC and conductor 257 through the lower contact of switch LS3A and conductor 258 back through the now-closed switch 246, the closed stop switches 244 and 231 to the terminal 227. This operation continues until a predetermined number of up and down strokes of the nozzle jets is provided at which point the counter contact CC1 closes, thereby energizing the relay CR2 because the switch LS3A is now closed. The relay CR2 then holds in a closed state through the switch CR2 and the switch LS1 back through the conductor 258, as heretofore explained for preceding circuit paths identified. Contact CR2 is in the circuit of motors M5DN and M5UP and is normally closed. At the end of the selected number of strokes, the contact opens to prevent any oscillation of the peening nozzle during the time indexing occurs. The switch CR2 serially arranged with the air clutch solenoid S2 which is normally open, closes with energization of the relay CR2 thereby to energize the air clutch solenoid so that the turntable indexing mechanism, as depicted by FIG. 8 and there conventionally shown, starts its operation. With the start of operation of the driver shaft 258, the indicated cam 259 trips the limit switch LS2 (also marked 249) thereby to energize the relay winding CR3A. Energization of the relay winding CR3A causes the upper two switches CR3 to close and the lower switch CR3 to open. Relay CR3 holds in mechanically. The upper CR3 contact closes through the relay winding CR4A and the middle contact CR3 switch closes a circuit through the relay winding CR3B while the switch a contact in the conductor 261 opens. When the normally closed switch 249 or LS2 is open, it opens the circuit to the counter clutch coil 265 and the counter resets to its normal position. The peening air is then turned off by reason of the opening by the switch CR3 in conductor 261 and similarly, the switch CR3 in line with the conductor 262 thereby to interrupt current flow through the solenoid 251 and the conductor 250, thus, to turn off the air supply to the peening nozzles. As the cam driver shaft 258 of the indexing mechanism continues to rotate, it next trips the switch LS1. This, then, provides current flow through the relay CR4A because the indexing switch ISW is normally closed. With current flow then being provided from the terminal 227 through the stop contacts 231, 244 and the switch 246 and the conductor 258 for the stated conditions, the current flow is through the conductor 270, the closed switch ISW and the closed switch CR3 and the relay winding CR4A to the conductor 256 and the terminal 228. Energization of the relay CR4A will close switch CR4 which is arranged to hold mechanically.

Closure of the switch CR4 will then permit current flow through the circuit including conductor 271 and relay winding CR5A when the cam driver shaft 258 on its second rotation trips switch LS2. With this, the switch CR5 connected in the line with the conductor 261 will close and the switch CR5 in the line in parallel with the switch LS1 will open. The cam driver shaft 258 then continues to rotate and, in its second rotation, finally trips the switch LS1. This, then, de-energizes the relay winding CR2 of the air clutch and the air clutch S2 stops the indexing mechanism. When the relay winding CR3B is energized, it releases the mechanical latch or hold on switches CR3 and all of the switches CR3 return to a normal state as indicated by FIG. 16. When the switches CR3 reset, the contact which has been held open to the conductor 261 closes and the counter clutch and the peening air supply through solenoid 251 are re-energized as when the start button 242 was first closed.

For these conditions, the CR2 switches and the CR3 switches have reset to the original positions and the nozzle oscillation again starts and the cycle is repeated.

It should be remarked that when the nozzle-carrying bracket structure 60 reaches its lower position so that the bracket 108, through the collar 110, trips the limit switch in one direction, the coils CR4B and CR5B are energized to release the mechanical latches held on switch CR4 and CR5 and these switches then restart to the normal state. Each of the latch-type relays CR3, CR4 and CR is used so that if the power is turned off for any reason once the indexing is started, the machine will complete the indexing cycle when the power is again restored. This prevents oscillating motion at any time that a blade is directly under the nozzle. It will be appreciated that unless this is done, the supported blade held in the holder (see 158 in FIG. 11, for instance) could be damaged if the nozzles were to start a downward movement at the wrong time.

The foregoing has been a description of the general type of operation for conditions of double index provided through the indexing mechanism. If single indexing is used, the cycle is essentially the same until the indexing starts. Then, as the cam driver shaft 258 rotates, it causes a cam to trip the limit switch LS2 thereby to energize the relay CR3 through the relay winding CR3A. CR3 switches are held in mechanically and the CR3 contact in the line to the oscillation coils and the conductor 261 is open. At this time, the connection through the center switch CR3 closes to provide current flow through the relay winding CR3B when switch LS1 is tripped by the cam.

When the normally closed limit switch 249 opens, a circuit is opened to the counter and clutch coils CC and 265, respectively and, as already explained, the peening jet is turned off. The cam driver shaft, of course, continues to rotate and finally trips the switch LS1 to de-energize the relay CR2 and, with it, the air clutch S2. This stops the indexing mechanism, as already explained.

The relay coil CR3B is energized to release the mechanical latch and the switches CR3 then reset to the normal state of that which is indicated. When the switches CR3 reset, the contact which has been held open in the line to the conductor 261 and the counter and the clutch and the peening air solenoid 251 are again energized. Since both the relay windings CR and CR3 have contacts in the oscillation circuit, they should be reset to the closed position after which the oscillation will again be restarted and the cycle repeated as desired.

If at any time in the operation any emergency arises, it will be appreciated that the entire apparatus may be disabled by merely depressing the stop button switch 231 connected in the line between the terminal 227 and the terminal 228. On the other hand, if it be desired merely to stop any one of the different operations which have here been described, that one operation or that sequence of operations can be stopped by any one of the stop switches 233, 235, 241 and 244. In each instance, the start switches 232, 234, 240, 242 and 243 are closed and then merely reopened due to the fact that a holding path is provided about each of the switches. Illustratively energization of the winding M2 closes contact M2 connected in shunt to the start switch 232 for the elevator and conveyor. Similarly, with the depression of the start switch 242 and the ganged switch 243 to start the indexing cycles causes the energization of the relay winding CR1 and this, in turn, closes the contact of the switch 245 and provides a holding circuit for this relay. Whenever one of the stop switches is open, however, even though it may immediately return to its indicated normal position, the mechanism is not self-restarting but must be started by the operator. In each instance, it will be observed that the holding contacts about each starting switch also provides a holding current flow to the lamps 275, 276, 277 and 278 thereby immediately to advise the operator which of the units is functioning. Interruption in any one of the circuits disables the relay which provides the holding current and, therefore, extinguishes one of the lights. Energization of all of the lights 275 through 278 indicates that all components of the system are functioning. Energization of the lamp or light 230 indicates that the system is in condition to function although not actually connected in an operative state.

For reasons of clarity both in the illustration of structural features and in the schematic diagram of the circuitry to control indexing and the like, interlocks have been omitted. It is to be understood, however, that in the apparatus, it is preferable to include interlocks connecting into the electrical circuitry in respect of each door or cover member which is capable of being opened or removed. The interlocks serve generally a dual purpose in this connection. First, for the safety of the equipment and the products being worked with, interlocks are desirable and, secondly, the peening operation in inherently dust producing and, therefore, from the standpoint of air pollution and the like, the interlocks are desirable in order that dust and the like may be conveyed away from the machine in accordance with some approved and satisfactory form of disposal of the general character illustrated, for instance, by the showings of FIGS. 4 and 5.

Various modifications and appropriate changes may be made in the circuitry here shown as it will become apparent to those skilled in the art to which the invention is directed. It should be observed that for convenience of showing, all switches have been shown in their normal position. Energization of the relay coils having similar letter designations cause the switches to reverse the state of operation from that indicated on the drawing. Illustratively, energization of a relay associated with a switch shown in the drawing as closed will cause that switch to open or, if already shown open, will cause that switch to close.

Having described the invention, what is claimed is:

1. Peening apparatus comprising
a multiplicity of nested peening nozzles,
a rotatable work holder turntable for positioning work to be peened in the vicinity of the nozzles,
means to hold the work to be peened on a portion of the work holder within the range of the nested peening nozzles and to permit the peened work to be removed and replaced by new work components later to be peened, the said removal and replacing means being removed from the range of the multiplicity of nested peening nozzles,
means for moving the nozzles in a reciprocating fashion relative to the work on the work holder,
means to index the relative positions of the peening nozzles and the work holder in coordinated relationship relative to the movement of the nozzles,
means to eject shot from the nozzles in a direction to impact work supported on the work holder, and
means to rotate the multiplicity of nested nozzles in clockwise and counter-clockwise directions through a selected arcuate path coincidentally with the nozzle reciprocation.

2. The peening apparatus claimed in claim 1 comprising, in addition,
flexible means to supply shot to the nozzles independently of the nozzle position relative to the extremities of the motional paths.

3. The peening apparatus claimed in claim 2 comprising, in addition,
hopper means connected to supply shot to the multiplicity of nested nozzles, and
means to connect the flexible means to maintain the shot supply within the hopper means.

4. The peening apparatus as claimed in claim 3 comprising, in addition,
flexible connections to introduce fluid under pressure independently to each nozzle of the multiplicity for ejecting shot from the said nozzles.

5. The peening apparatus claimed in claim 4 comprising, in addition,
means to adjust the angular position of each nozzle relative to each other and to the hopper and the work supported by the work holder, and, in addition,
means to adjust the distance of each nozzle from the supply hopper whereby work to be peened carried by the work holder is subjected in different areas to the action of the shot ejected from the nozzles.

6. The peening apparatus claimed in claim 1 wherein the work holder comprises, in addition,
means to release each of the plurality of means to support work to be peened in a region external to the nozzles and to clamp the replacement work thereon prior to the time when the turntable support is rotated to the region of the nozzles.

7. The peening apparatus claimed in claim 6 comprising, in addition,
means to suspend the turntable from a drive position for free rotational movement relative to the multicity of nozzles.

8. The peening apparatus claimed in claim 7 comprising, in addition,
means to register the number of nozzle reciprocations relative to the work holder,
means to maintain the work holder and the supported work substantially stationary during nozzle reciprocation, and
means for rotating the work holder and work held thereon in a stepped pattern relative to the nozzle following a selected number of nozzle reciprocations.

9. The peening apparatus claimed in claim 8 comprising, in addition,
means to arrest reciprocation and rotation of the multiplicity of nested nozzles at substantially the uppermost position of reciprocation following a selected number of reciprocations, and
means to coordinate the period of arrest of nozzle movement and successive movements of the work-support turntable.

10. The peening apparatus claimed in claim 3 comprising, in addition,
means to suspend the multiplicity of nested nozzles from the supply hopper means,
means to reciprocate the complete nozzle assembly and the supported hopper and nozzles in a substantially vertical path, and
means to control the length of the reciprocating stroke.

11. The peening apparatus claimed in claim 10 comprising, in addition, cam means for rotating the nested nozzles and the supply hopper in alternating clockwise and counter-clockwise directions through a limited angle of movement about an axis substantially parallel to the path of reciprocation of the hopper and nozzles.

12. The peening apparatus claimed in claim 1 comprising, in addition, adjustable limiting means to control the upper and lower limits of reciprocation in the vertical plane.

13. The peening apparatus claimed in claim 4 comprising, in addition, a collection chamber for collecting shot subsequent to its direction toward and upon work adapted to be held by the rotary work holder, and means to convey the collected shot to a dispensing point from which it may be reused.

14. The peening apparatus claimed in claim 13 comprising, in addition, a main supply hopper supported at the dispensing point for gathering shot for reuse and for dispensing the shot to the first named hopper.

15. The apparatus claimed in claim 14 wherein the main supply hopper at the dispensing point comprises means to segregate peening shot of an optimum size and to supply said shot to the reciprocating hopper, means to collect for salvage oversize components and undersize components, and means to eject collection dust and refuse from the apparatus.

16. The peening apparatus claimed in claim 14 comprising, in addition, gate means supported between the main supply hopper and the reciprocating hopper for dispensing shot to the reciprocating hopper.

17. The apparatus claimed in claim 16 comprising, in addition, pneumatic means for controlling gate means for dispensing shot to the reciprocating hopper.

18. Peening apparatus as claimed in claim 15 comprising, in addition, means to interlock the control of the collected shot dispensation from the main supply hopper and the removal of refuse with the indexing and the supply of fluid to the nozzles for peening operations.

19. An air gate structure particularly adapted for supplying peening shot to peening apparatus comprising a rigid tubular element adapted to receive shot at one end and to permit selected portions of the received shot to be ejected from the opposite end along substantially the same axial path as that on which the shot is received at the receiving end, a flat plate diaphragm closure element positioned between the ends of the tubular element for blocking the direct passage of shot therethrough, resilient means connected to the closure element for normally moving the said diaphragm element toward the closed position, and a means for producing a controlled opening of the closure element against the force of the resilient means, thereby to permit a controlled amount of shot to move between the entrance and exit regions of the tubular means.

20. The air gate structure claimed in claim 19 comprising, in addition, a shot-ejecting port leading into the tubular means on the downstream side from the closure means thereby to provide an overflow outlet in the event the downstream side of the tubular means is overloaded.

21. The air gate structure claimed in claim 20 comprising, in addition, a chamber diaphragm means to close the chamber, means for introducing fluid into the closed chamber for expanding the diaphragm thereby to open the closure means with a build-up of pressure within the closed chamber and to permit the resilient force to close the closure means with reduction of pressure within the chamber.

22. The air gate structure as claimed in claim 21 wherein the closure means is connected to one end of the resilient means and wherein the opposite end of the resilient means is anchored to the gate structure and comprising, in addition, means to support the resilient diaphragm means between the closure means and the anchoring point of the resilient means thereby to form the valve control means into a third class lever control.

23. The air gate structure claimed in claim 22 wherein the resilient means comprises a flat leaf spring.

24. A work holder particularly adapted for peening apparatus comprising a turntable element having a substantially annular work holding region interiorly positioned relative to its outer periphery and its inner periphery, a plurality of substantially radial partitioning means dividing the annular work holding region into a selected number of susbtantially equal sections, means to support a plurality of resilient elements in each formed section of the annular work holding region of the turntable, and means extending through the resilient means for maintaining a selected position of supported work held therein and for determining the portion of the supported work to be peened.

25. The work holding elements claimed in claim 24 wherein each sectional resilient element comprises an arcuately shaped member having a plurality of openings extending therethrough, the openings being located substantially on its circumferential path for locating work in the holder, a plurality of plug elements adapted to be positioned in selected ones of the openings for supporting one end of a work piece, a first post element extending through other selected openings adjacent to said openings wherein said plug members are located, a second plug member adapted to be positioned at the outer end of any work piece positioned within the first plug member, clip means extending from the outer end of said post means and adapted to hold the second plug means to the free end of the supported work, and resilient means for drawing the post means and the clips tightly over the free end of the work thereby substantially rigidly to support the work relative to the peening apparatus.

26. Peening apparatus comprising a multiplicity of nested peening nozzles supported in generally arcuate relationship to each other, a rotatable work holder turntable for positioning work to be peened in the vicinity of the nozzles, means for moving the nozzles relative to the work on the work holder along a reciprocating path of controlled length, means to index the relative positions of the work holder and peening nozzles in a relationship coordinated relative to the path of movement of the nozzles, means to eject shot from the nozzles in a direction to impact work supported on the work holder of the turntable within a limited arc of each rotation, and means to rotate the multiplicity of nested nozzles through limited angular paths in clockwise and counter-clockwise directions coincidentally with the nozzle reciprocation.

27. Peening apparatus comprising a peening nozzle unit, a work holder for positioning work to be peened in the vicinity of the nozzle unit, means for moving the nozzle unit in a reciprocating fashion relative to the positioned work on the work holder, means to index the relative positions of the peening nozzle unit and the work holder coincidentally with the movement of the nozzle unit, means to eject shot from the nozzle unit in a direction to impact positioned work supported on the work holder, and means to rotate the nozzle unit in clockwise and counterclockwise directions about an axis corresponding to the direction of reciprocation and coincidentally and concurrently therewith.

28. The peening apparatus claimed in claim 27 wherein the work holder drive means comprises, in addition, means to move the turntable in stepped fashion.

29. The peening apparatus claimed in claim 28 comprising, in addition, means to register the number of reciprocations of the nozzle relative to the work holder, means to maintain the work holder and the supported work substantially stationary during each reciprocation of the nozzle unit, means for rotationally stepping the work holder and work held thereon relative to the nozzle unit following a selected number of reciprocations of the nozzle unit, thereby to transport peened work away from the nozzle unit and to transport unpeened work into the range of the peening unit, and means to hold the peening unit in an inoperative state and removed from the vicinity of the supported work during the stepping movement and to restore operation upon completion of the stepping movement.

30. The peening apparatus claimed in claim 28 wherein the means to move the work-holding turntable in stepped fashion includes means to limit the periods of movement to periods of arrest of nozzle unit reciprocation and to periods when the nozzle unit is at the upper end of the path of movement and removed from a peening position.

31. An air gate structure particularly adapted for supplying peening shot to peening apparatus comprising a feed element adapted to receive shot at one end and to permit selected portions of the received shot to be ejected from the opposite end, a closure element positioned between the ends of the feed element for blocking the passage of shot therethrough when said element is in a rest position, resilient means connected to the closure element for normally moving the closure element toward the closed rest position, a pneumatic means for producing a controlled opening of the closure element against the force of the resilient means thereby to permit a controlled amount of shot to move between the entrance and exit regions of the feed means.

32. The air gate structure claimed in claim 31 comprising, in addition, a duct region leading into the feed element on the downstream side from the closure element for providing a support region for the resilient means and an overflow outlet in the event the downstream side of the tubular means is overloaded.

References Cited

UNITED STATES PATENTS

| | | | |
|---|---|---|---|
| 2,489,877 | 11/1949 | Fowler | 72—53 |
| 2,881,506 | 4/1959 | Fuchs | 72—53 |
| 2,968,086 | 1/1961 | Fuchs | 72—53 |
| 3,094,768 | 6/1963 | Croft | 72—53 |
| 3,131,457 | 5/1964 | Correll | 72—53 |

CHARLES W. LANHAM, *Primary Examiner.*

G. P. CROSBY, *Assistant Examiner.*

U.S. Cl. X.R.

51—319